United States Patent
Saavedra Román (10) Patent No.: US 11,443,563 B2
(45) Date of Patent: Sep. 13, 2022

(54) DRIVING RANGE BASED ON PAST AND FUTURE DATA

(71) Applicant: Toyota Motor North America, Inc., Plano, TX (US)

(72) Inventor: José Guillermo Saavedra Román, The Colony, TX (US)

(73) Assignee: TOYOTA NORTH AMERICA, INC., Plano, TX (US)

( * ) Notice: Subject to any disclaimer, the term of this patent is extended or adjusted under 35 U.S.C. 154(b) by 420 days.

(21) Appl. No.: 16/508,221

(22) Filed: Jul. 10, 2019

(65) Prior Publication Data

US 2021/0012584 A1 Jan. 14, 2021

(51) Int. Cl.
*G07C 5/00* (2006.01)
*G06N 5/04* (2006.01)
*B60W 40/09* (2012.01)

(52) U.S. Cl.
CPC ............. *G07C 5/004* (2013.01); *B60W 40/09* (2013.01); *G06N 5/046* (2013.01)

(58) Field of Classification Search
CPC .. B60W 50/0097; B60W 30/09; B60W 40/09; G01C 21/3469; B60L 58/12; B60L 53/66; B60L 53/67; B60L 53/665; B60L 50/60; G06F 15/00; G01R 31/3835; B60K 37/02; B60K 6/445; B60H 1/00778; G07C 5/00; G07C 5/004
See application file for complete search history.

(56) References Cited

U.S. PATENT DOCUMENTS

| 6,615,133 B2 | 9/2003 | Boies et al. |
| 7,360,615 B2 | 4/2008 | Salman et al. |
| 7,778,769 B2 | 8/2010 | Boss et al. |
| 7,999,664 B2 | 8/2011 | Barajas |
| 8,457,874 B2 | 6/2013 | Kancharla et al. |

(Continued)

FOREIGN PATENT DOCUMENTS

| CN | 104340218 A | * | 2/2015 | ............. B60K 6/445 |
| CN | 104442817 | | 4/2017 | |
| WO | WO 2011019240 | | 2/2011 | |

OTHER PUBLICATIONS

Slavin et al. "Empirical Modeling of Vehicle Fuel Economy Based on Historical Data"; Proceedings of the International Joint Conference on Neural Networks IEEE; pp. 2904-2909; Aug. 4-9, 2013.

*Primary Examiner* — Yuri Kan
(74) *Attorney, Agent, or Firm* — Snell & Wilmer LLP (57) ABSTRACT

A system for determining a driving range of a vehicle includes an energy storage component to store electrical energy or fuel. The system further includes a power source to convert the electrical energy or fuel into mechanical power to propel the vehicle. The system further includes a memory to store map data including road speeds, altitude data, road grades, or stop information corresponding to at least one of stop signs or stop lights, and a first driver profile corresponding to driving behavior of a first driver. The system further includes an electronic control unit (ECU) designed to predict the driving range of the vehicle based on an amount of the at least one of the electrical energy or fuel remaining in the energy storage component, the map data, and the first driver profile. The system further includes an output device designed to output the driving range of the vehicle.

20 Claims, 4 Drawing Sheets

(56) References Cited

U.S. PATENT DOCUMENTS

| | | | |
|---|---|---|---|
| 8,577,605 B2 | 11/2013 | Breslau et al. | |
| 8,972,090 B2 | 3/2015 | Weslati et al. | |
| 9,008,880 B2 | 4/2015 | Sangameswaran et al. | |
| 9,140,568 B2 | 9/2015 | Waite et al. | |
| 9,213,670 B2* | 12/2015 | Edgren | G06F 15/00 |
| 9,623,765 B2* | 4/2017 | Liu | B60L 58/12 |
| 9,643,511 B2* | 5/2017 | Jeon | G01C 21/3469 |
| 9,644,967 B2 | 5/2017 | Yoshizu | |
| 10,295,362 B2* | 5/2019 | Choi | B60L 50/60 |
| 10,471,844 B2* | 11/2019 | Lee | B60H 1/00778 |
| 10,552,923 B2* | 2/2020 | Cun | B60L 53/665 |
| 10,648,845 B2* | 5/2020 | Sung | B60K 37/02 |
| 10,690,725 B2* | 6/2020 | Diamond | G01R 31/3835 |
| 10,859,390 B2* | 12/2020 | Fisher | B60L 53/67 |
| 2013/0339072 A1* | 12/2013 | Touge | B60L 53/66 705/5 |
| 2016/0300408 A1 | 10/2016 | Dudar et al. | |
| 2017/0066328 A1 | 3/2017 | Yoon | |
| 2018/0281784 A1* | 10/2018 | Huang | B60W 30/09 |

\* cited by examiner

DRIVING RANGE BASED ON PAST AND FUTURE DATA

BACKGROUND

1. Field

The present disclosure relates to systems and methods for accurately predicting an efficiency and a driving range of a vehicle.

2. Description of the Related Art

Many vehicles now compute driving ranges as part of trip computer features. The paradigm that is used for computing this value focuses on assessing the fuel economy of the vehicle based on historical data and then estimating a driving range of the vehicle based on the available amount of fuel in a fuel tank. However, such predictions of driving range may be inaccurate for a variety of reasons. For example, different drivers drive vehicles in many different manners. Some drivers may drive in a fuel-efficient manner (e.g., slow accelerations, coasting), and other drivers may drive in a manner that reduces fuel economy. In addition, some routes may require more energy to traverse than others. For example, a route that includes a long uphill climb may require more energy than a route along flat terrain. In consequence, there is no upfront information about the expected fuel economy. Also, some vehicles of the same make and model may experience different fuel efficiencies based on wear and tear of the engine or motor, state of tires, an amount of time elapsed since the vehicle has been serviced, or the like.

Therefore, systems and methods for predicting fuel economy and driving ranges with increased accuracy are desirable.

SUMMARY

Described herein is a system for determining a driving range of a vehicle that uses a different paradigm in which the calculation of the driving range is computed based on historical and forecasted data. The system includes an energy storage component designed to store at least one of electrical energy or fuel. The system further includes a power source designed to convert the at least one of electrical energy or fuel into mechanical power to propel the vehicle. The system further includes a memory designed to store map data that includes at least one of road speeds, altitude data, road grades, or stop information corresponding to at least one of stop signs or stop lights (behavior and timing), and a first driver profile corresponding to driving behavior of a first driver. Alternatively the system can retrieve the information described above from a remote system with which it establishes connection. The system further includes an electronic control unit (ECU) coupled to the memory and designed to predict the driving range of the vehicle based on an amount of the at least one of the electrical energy or fuel remaining in the energy storage component, the map data, the route(s) to be traveled, and the first driver profile. The system further includes an output device coupled to the ECU and designed to output the driving range of the vehicle.

Also disclosed is a system for determining a driving range of a vehicle. The system includes an energy storage component designed to store at least one of electrical energy or fuel. The system further includes a power source designed to convert the at least one of electrical energy or fuel into mechanical power to propel the vehicle. The system further includes a memory designed to store map data that includes at least one of road speeds, altitude data, road grades, or stop information corresponding to at least one of stop signs or stop lights, and a first driver profile corresponding to driving behavior of a first driver. The system further includes an electronic control unit (ECU) coupled to the memory and designed to predict a future fuel economy of the vehicle based on a historical energy efficiency of the power source, the map data, the routes to be traveled and the first driver profile. The system further includes an output device coupled to the ECU and designed to output the future fuel economy of the vehicle.

Also disclosed is a method for determining a driving range of a vehicle. The method includes storing, in an energy storage component, at least one of electrical energy or fuel. The method further includes converting, by a power source, the at least one of electrical energy or fuel into mechanical power to propel the vehicle. The method further includes storing, in a memory, map data that includes at least one of road speeds, altitude data, road grades, or stop information corresponding to at least one of stop signs or stop lights. The method further includes storing, in the memory, a first driver profile corresponding to driving behavior of a first driver. The method further includes predicting, by an electronic control unit (ECU), the driving range of the vehicle based on an amount of the at least one of the electrical energy or fuel remaining in the energy storage component, the map data, the routes to be traveled and the first driver profile. The method further includes outputting, by an output device, the driving range of the vehicle.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for providing accurate fuel economy and driving range data to a user. The systems provide advantages such as increased accuracy of fuel economy and driving range calculations, allowing a user to more comfortably predict when the vehicle will require recharging or refueling. The systems advantageously calculate the fuel economy and driving range based on specific driver profiles and specific vehicle profiles, thus allowing the increased accuracy to apply to a same driver in multiple vehicles. The systems provide additional benefits and advantages such as outputting a comparison of expected vehicle efficiency to actual vehicle efficiency, thus incentivizing a driver to drive in a more efficient manner. The systems also may provide tips to the driver that the driver may implement to increase efficiency, further advantageously incentivizing the driver to increase efficiency. This increased driver efficiency provides advantages such as reducing trip costs for a driver and reducing harmful fossil fuels being released into the environment.

An exemplary system includes a memory to store a driver profile, a vehicle profile, and map data. The system may further include a battery to store electricity or a fuel tank to store fuel. The system may also include an electronic control unit (ECU). The ECU may be designed to predict a route, and to predict fuel economy of the trip (route) based on the driver profile, the vehicle profile, the map and traffic data, and the characteristics of the predicted route, such as the number of stop signs or lights along the trajectory, the travel speeds that are typical on those roads, elevation profile of the trajectory and the like. The ECU may also predict a driving range of the vehicle based on the fuel economy, the routes that were learned from common whereabouts of the driver in daily and weekly basis, and a remaining amount of electricity in the battery or fuel in the fuel tank.

Figure 1:
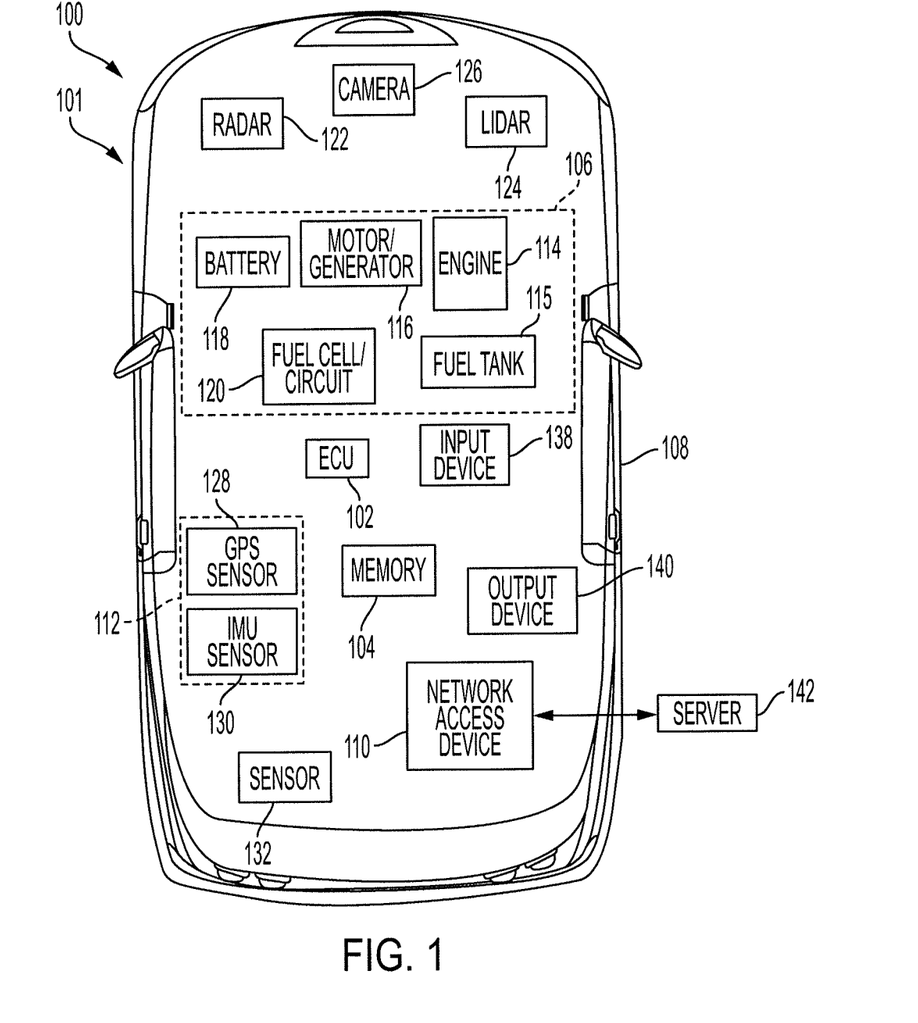
FIG. 1 is a block diagram illustrating a system and a vehicle for accurate prediction of fuel economy and driving range according to an embodiment of the present invention.

Turning to FIG. 1, a vehicle 100 may include a system 101 for predicting a driving range based on various factors. The vehicle 100 (or system 101) may include an ECU 102, a memory 104, a power source 106, and a main body 108. The vehicle 100 (or system 101) may further include a network access device 110, a location sensor 112, a radar sensor 122, a light imaging and ranging (lidar) sensor 124, a camera 126, and another sensor 132. The vehicle may also include an input device 138 and an output device 140.

The main body 108 may be propelled along a roadway, may be suspended in or on water, or may fly through air. The main body 108 may resemble a vehicle such as a car, a bus, a motorcycle, a boat, an aircraft, or the like. The main body 108 may further support one or more individual such as a driver, a passenger, or the like.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality.

The memory 104 may include any non-transitory memory and may store data usable by the ECU 102. For example, the memory 104 may store map data, may store user profiles, may store vehicle profiles, may store instructions usable by the ECU 102 to drive autonomously, may store instructions usable by the ECU 102 to predict a driving range of the vehicle 100, or the like.

The power source 106 may include any one or more of an engine 114, a fuel tank 115, a motor-generator 116, a battery 118, or a fuel-cell circuit 120. The engine 114 may convert a fuel into mechanical power for propelling the vehicle 100. In that regard, the engine 114 may be a gasoline engine, a diesel engine, an ethanol engine, or the like.

The fuel tank 115 may store a fuel, such as gasoline, diesel, ethanol, or the like, usable by the engine 114 to generate mechanical power. The fuel tank 115 may include a sensor capable of detecting a weight, volume, or other measurement corresponding to a remaining amount of fuel in the fuel tank 115.

The battery 118 may store electrical energy. In some embodiments, the battery 118 may include any one or more energy storage devices including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116. In some embodiments, the vehicle 100 may include multiple fuel-cell circuits including the fuel-cell circuit 120.

In some embodiments, the fuel tank 115 may store fuel usable by the fuel-cell circuit 120 generate electricity. For example, the fuel tank 115 may store oxygen, hydrogen, or the like.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The sensor 132 may include one or more of the location sensor 112, the radar sensor 122, the lidar sensor 124, the camera 126, a sensor capable of detecting a status of a vehicle component, a sensor capable of detecting environmental conditions (including weather), or the like. As additional examples, the sensor 132 may include one or more of a grade sensor designed to detect a grade of a current roadway, an altimeter designed to detect an altitude of the vehicle 100, a speed sensor (such as an angular velocity sensor coupled to one or more wheel) designed to detect a speed of the vehicle 100, or the like. The sensor 132 may also or instead include one or more of a voltage sensor, a current sensor, a temperature sensor, a pressure sensor, a fuel gauge, an airflow sensor, an oxygen sensor, or the like.

The radar sensor 122, the lidar sensor 124, the camera 126, and the sensor 132 may detect data corresponding to an environment of the vehicle 100. For example, one or more of these sensors may detect the presence of objects near the vehicle 100, may detect a distance between the vehicle 100 and a leading or following vehicle, may detect weather events, may detect traffic information, or the like. The ECU 102 may use this detected data to autonomously control the vehicle 100, to identify landmarks, or the like.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wired or wireless protocol. The network access device 110 may communicate with a remote server 142 that may store data as requested by the ECU 102. For example, the ECU 102 may determine data corresponding to a driving profile of the driver. The ECU 102 may create a driver profile based on the data or may transmit the data to the server 142 which may generate or update the driver profile. The driver profile may correspond to driving characteristics of the driver such as acceleration patterns of the driver, braking patterns of the driver, and aggression level of the driver, or the like.

The input device 138 may include any one or more input device such as a button, a keyboard, a mouse, a touchscreen, a microphone, or the like. The input device 138 may receive input from a user of the vehicle 100 such as a driver or a passenger.

The output device 140 may include any output device such as a speaker, a display, a touchscreen, or the like. The output device 140 may output data to a user of the vehicle.

As mentioned briefly above, the vehicle 100 (or system 101) may be designed to accurately predict a driving range of the vehicle 100. For example, the ECU 102 may determine or receive driving range data including one or more of driving characteristics of the driver (the driver profile), fuel economy characteristics of the power source 106, a remaining amount of electricity in the battery 118, a remaining amount of fuel in the fuel tank 115, map data stored in the memory 104, current weather in the vicinity of the vehicle 100, characteristics of a current roadway, or the like. The ECU 102 may determine a fuel economy of the vehicle 100 based on the driving range data (including the driver profile), and may predict the driving range of the vehicle 100 based on the fuel economy of the vehicle 100 and the driving range data.

In some embodiments, the vehicle 100 may be used as a rideshare vehicle, with or without driver control. In that regard, prediction of the fuel economy and driving range may allow the vehicle 100 to be used as much as possible prior to recharging or refueling, thus increasing profits of the rideshare company.

Figure 2:
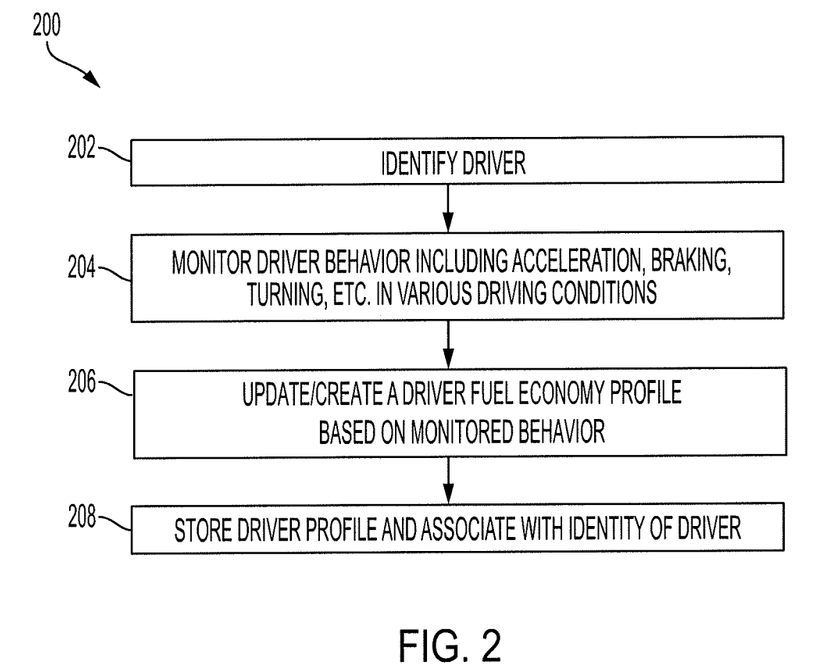
FIG. 2 is a flowchart illustrating a method for creating or updating a driver profile according to an embodiment of the present invention.

Referring now to FIG. 2, a method 200 for creating or updating a driver profile is shown. The method 200 may be performed by a system similar to the system 101 of FIG. 1. In particular and in block 202, an ECU of the vehicle may identify a current driver of the vehicle. This may be done in any of a variety manners. For example, a driver may provide input using an input device (such as a fingerprint scanner) that the ECU may use to identify the driver. As another example, a camera or other sensor of the vehicle may detect image data or other data is usable by the ECU to identify the driver. As yet another example, the driver may have a personal key or key fob for the vehicle and the ECU may identify the driver based on the key used to start the vehicle.

In block 204, the ECU may monitor driver behavior as the driver drives the vehicle in various driving conditions. For example, the ECU may monitor driver behavior such as how aggressive the driver accelerates in various situations (such as from a stop, as the user is merging onto a highway, after a turn on to a city street, or the like). The ECU may monitor additional driver behavior such as braking patterns (e.g., braking in traffic situations, braking at a stop sign or stop light, or the like). The ECU may further monitor driver behavior during turns (such as how fast the driver takes a turn, how much the driver decelerates the vehicle before a turn, or the like). The ECU may also monitor additional driver behavior such as how fast the driver drives (e.g., relative to a speed limit), whether the driver uses cruise control, vehicle settings while the driver is driving (e.g., air conditioning settings or other power-using vehicle settings), a mode of operation of the vehicle (sports mode or economy mode), or the like.

In block 206, the ECU may create or update a driver fuel economy profile associated with the current driver based on the monitored behavior. In some embodiments, the ECU may upload the monitored behavior to a server and the server may create or update the driver profile. If no profile exists for the current driver then the ECU may create a driver profile based on the monitored behavior. For example, the driver profile may include general adjustments to expected fuel economy of a vehicle for the particular driver, may include specific adjustments to fuel economy of a vehicle during specific activities (such as acceleration onto a highway), or the like. The driver profile may include additional information specific to certain vehicle types. For example, the driver fuel economy profile may include an average percent of residual energy captured during a regenerative braking event. In essence the driver fuel economy profile indicates what is the fuel economy a specific driver obtains depending the driving conditions at which the driver is exposed to.

After the driver profile has been created, the ECU (or server) may update the driver profile based on newly monitored behavior. For example, if newly monitored behavior indicates that the driver has changed his driving style to be less aggressive then the updated driver profile may reflect such change.

In block 208, the driver profile may be associated with an identifier of the driver and stored in a memory. For example, the driver profile may be stored on a local memory in the vehicle or may be transmitted to a remote server for storage. Due to the association between the identifier of the driver and the driver profile, an ECU may retrieve the driver profile based on the identification of the driver.

Figure 3:
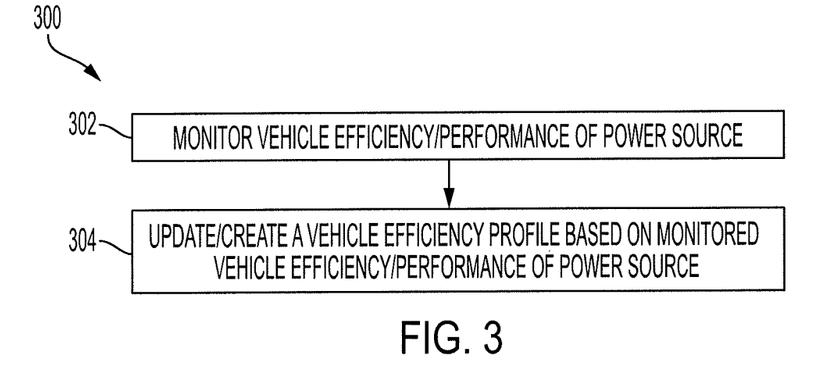
FIG. 3 is a flowchart illustrating a method for creating or updating a vehicle fuel economy profile according to an embodiment of the present invention.

Referring now to FIG. 3, a method 300 for creating or updating a vehicle fuel economy profile is shown. Although the term "fuel economy" is used in the specification, one skilled in the art will realize that "fuel economy" also refers to any energy efficiency of the vehicle such as efficiency of a battery, efficiency of a fuel-cell circuit, or the like.

The method 300 may be performed by a system similar to the system 101 of FIG. 1. The vehicle fuel economy profile may correspond to energy efficiency of a power source of a specific vehicle and may be individualized for each vehicle. The vehicle fuel economy profile may begin as a predetermined fuel economy profile programmed or provided to the vehicle by the vehicle manufacturer. The predetermined fuel economy profile may be generic, such as an expected fuel economy on highway and city streets, or may be specific, such as expected fuel economy at various speeds or in various driving conditions. In some embodiments, the vehicle fuel economy profile may be based solely on detected or determined performance of the vehicle without a predetermined fuel economy profile provided by the manufacturer.

In block 302, an ECU of the vehicle may monitor vehicle efficiency, including performance characteristics of the power source. The vehicle efficiency may correspond to fuel economy (such as miles per gallon), electric efficiency (such as miles per unit of state of charge (SOC)), or the like. The ECU may utilize data from various sensors for this determination such as a fuel gauge (to detect an amount of fuel being used), sensors to measure the instantaneous fuel consumption, a sensor to detect an amount of electricity used by a motor generator, a sensor to detect an amount of electricity generated during regenerative braking, or the like.

In block 304, the ECU may create or update a vehicle's fuel economy profile based on the monitored vehicle's fuel economy from block 302. The vehicle's fuel economy profile may be created after a sufficient quantity of data regarding vehicle's fuel economy is detected, and may be updated as new vehicle's fuel economy data is obtained. Different vehicles of the same make and model may perform differently based on different factors. For example, a specific vehicle may have greater efficiency after an engine tune-up than another vehicle of the same make and model that has not recently been serviced. In that regard, the vehicle's fuel economy profile may be tailored to specific vehicles based on data detected by sensors of the specific vehicle or calculated by ECUs of the specific vehicles.

Figure 4A:
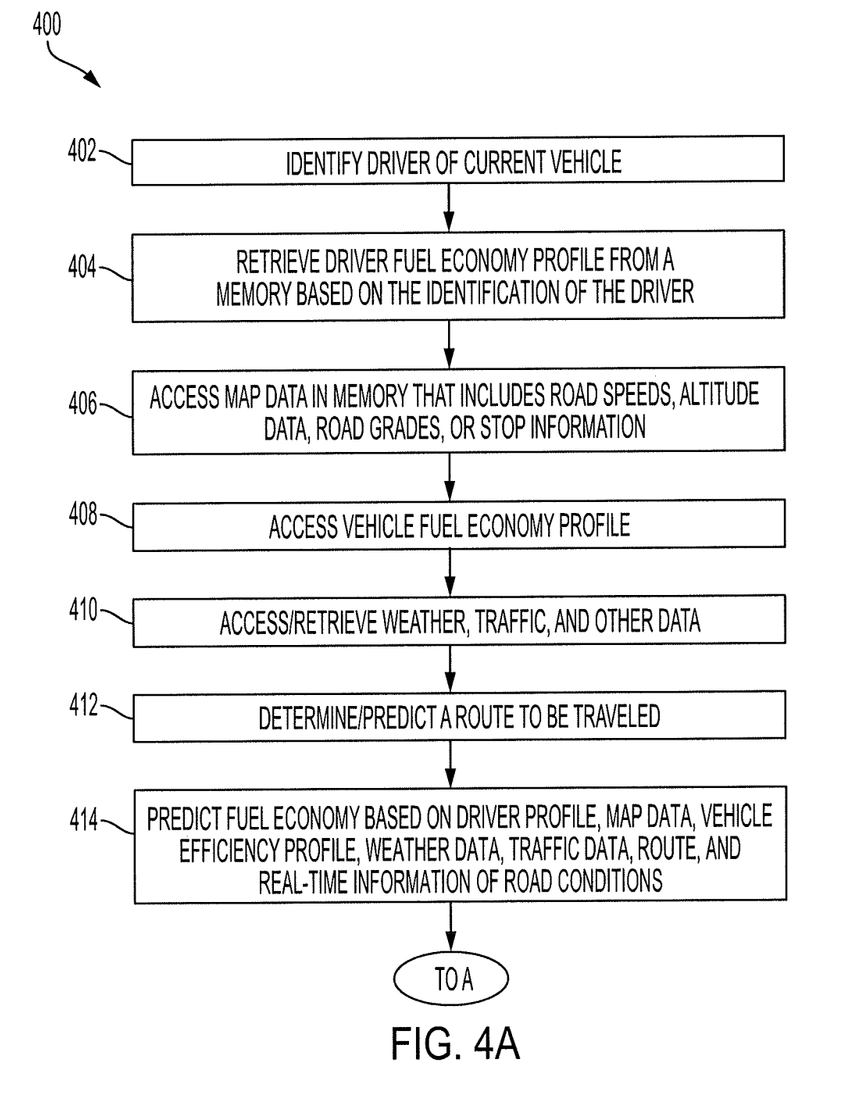
FIGS. 4A and 4B are flowcharts illustrating a method for accurate prediction of fuel economy and driving range of a vehicle according to an embodiment of the present invention.
Figure 4B:
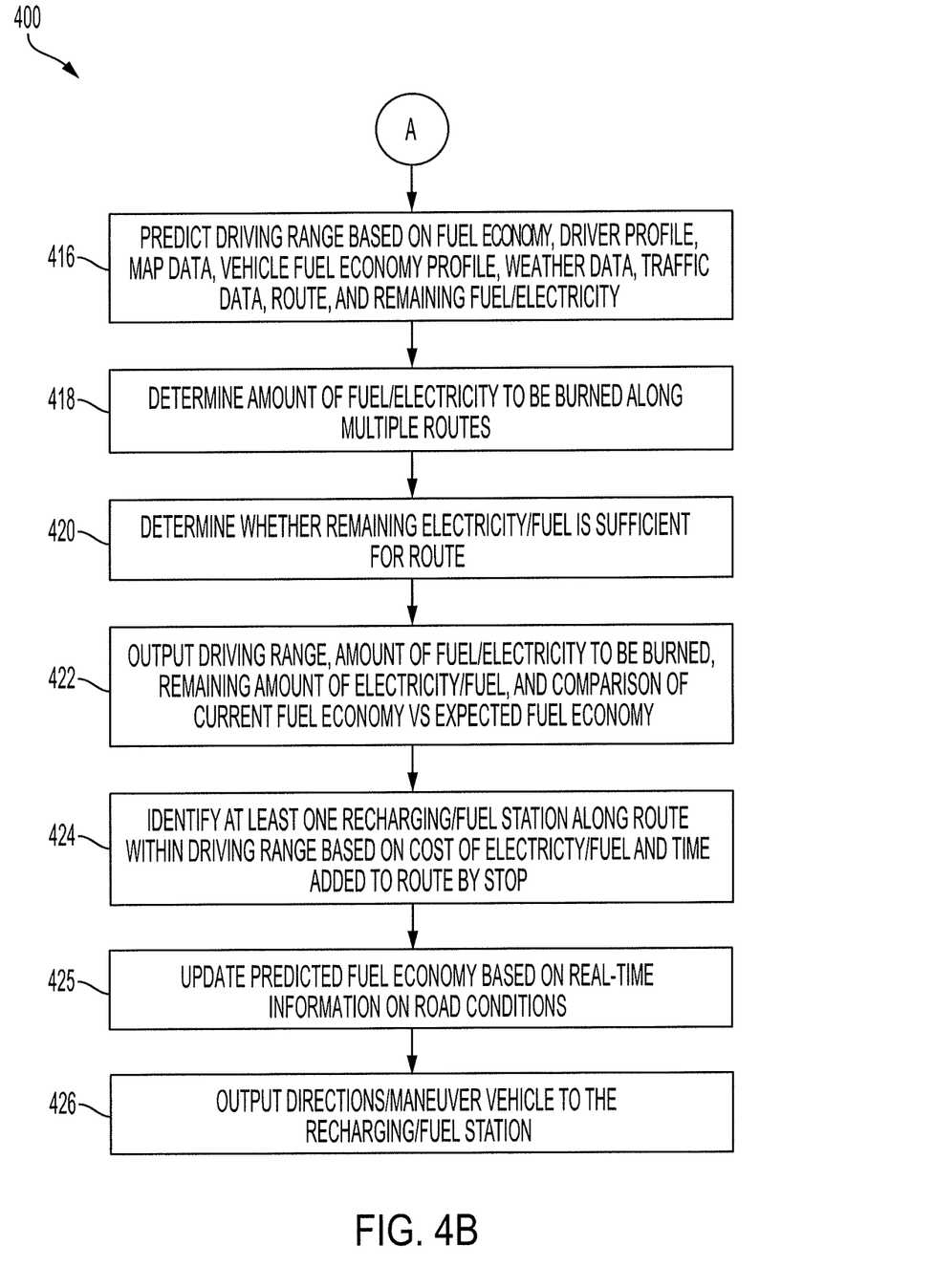

Turning to FIGS. 4A and 4B, a method 400 for determining a driving range of the vehicle is shown. The method 400 may provide a specific driving range for a specific vehicle by a specific driver. In that regard, the method 400 may provide greater accuracy than conventional methods for determining driving ranges. The method 400 may be performed by a system similar to the system 101 of FIG. 1.

In block 402, an ECU may identify a driver of the current vehicle. This may be performed in a similar manner as block 202 of FIG. 2.

In block 404, the ECU may retrieve a driver profile corresponding to the driver of the current vehicle from a memory. For example, the driver profile may be retrieved from a local memory located on the vehicle or may be retrieved from a remote server. The driver profile may be retrieved, for example, by providing an identifier of the driver to the memory and retrieving and associated driver profile.

In block 406, the ECU may access map data in a local or remote memory. The memory in which the map data is stored may be the same as or different than the memory in block 404. The map data may include information such as a network of roads of an area in which the vehicle is located, distances of the roads between waypoints, speed limits of the roads in the area, altitudes at which the various roads are positioned, road grades corresponding to incline angles or decline angles of the various roads, stop information corresponding to location and timing of stop lights and stop signs, or the like.

In block 408, the ECU may access or retrieve a vehicle fuel economy profile corresponding to the specific vehicle. The vehicle fuel economy profile may be stored in a memory onboard the vehicle or may be retrieved from a remote memory, such as from a cloud server. The vehicle fuel economy profile may be retrieved, for example, by transmitting an identifier of the vehicle to the memory and retrieving and associated vehicle fuel economy profile.

In block 410, the ECU may optionally access or retrieve additional data which may affect fuel or energy efficiency of the vehicle. The additional data may include, for example, weather data corresponding to weather in the vicinity of the vehicle, traffic data corresponding to traffic information in the vicinity of the vehicle, or the like.

In block 412, the ECU may determine or predict a route to be traveled by the vehicle. For example, a user may use an input device or a synced mobile device to provide a destination for a current trip. In such embodiments, the ECU may determine the route based on the current location of the vehicle (as detected by a location sensor) and based on the location of the destination. In some embodiments, the remote device may determine the route and may provide the route to the ECU.

In some embodiments, the ECU may predict the route based on various factors such as day of the week, time of day, the specific driver, specific passengers in the vehicle (e.g., whether children are present in the vehicle), or the like. For example, the ECU may learn that every weekday at 8 AM the driver drives the vehicle to a work destination. If the ECU determines that the driver enters the vehicle at 8 AM then the ECU may predict the route to be a route from the current location of the vehicle to the location of the work destination. In such case the traffic data and trajectory data pulled from map can be used to estimate the forecasted fuel economy that in conjunction with vehicle's fuel economy profile, driver's fuel economy profile and amount of fuel/electricity available will be used to compute the driving range.

In block 414, the ECU may predict fuel economy of the vehicle along the route. The ECU may predict the fuel economy based on various factors such as the driver fuel economy profile, the vehicle fuel economy profile, the map data, the weather data, and the traffic data. For example, the ECU may determine that the route includes 2 miles of city roads at an incline of 5 percent (5%) (decreasing fuel economy) and then 3 miles of highway driving at a 0% road grade (leveling off the fuel economy). The ECU may further determine that the roads are located relatively close to sea level, thus increasing fuel economy. The ECU may determine that the vehicle's fuel economy profile indicates that the vehicle has a fuel economy of 25 miles per gallon on city roads and 35 miles per gallon on highway roads. The ECU may also determine that the driver fuel economy profile indicates that the driver is an aggressive driver, further decreasing fuel economy. The ECU may also determine the fuel economy of the trip based on driver fuel economy profile (historic) and future information (such as the route to be traveled and traffic conditions at the time of travel). Basically the ECU determines how much fuel economy the specific driver will achieve at the travel conditions he is and will be exposed to.

In block 416, the ECU may predict a driving range of the vehicle based on the determined fuel economy, the profiles, the map data, the weather data, the traffic data, the route, and the remaining levels of fuel or electrical energy. For example, the ECU may apply the fuel economy predicted in block 414 to the specific route to determine an amount of fuel or electricity used along the route, and may calculate the driving range of the vehicle based on this amount of fuel or electricity predicted to be used along the route.

In block 418, the ECU may determine or predict fuel or electricity usage along multiple routes from the starting location to the destination. These calculations may be performed in a similar manner as blocks 414 and 416 above. In particular, the ECU may select the top 3 or 5 routes based on distance between starting location and destination, based on predicted travel time from the starting location to the destination, or the like. The ECU may then predict the fuel or electricity usage along each route. In some embodiments, the driver may select which route to travel and, in some embodiments, the ECU may select the route that is the least expensive energy wise or based on a combination of energy cost, time to destination, and total distance. Also, the ECU may determine the actual cost of each route based on how much the driver actually paid for that current fuel (using the record from last re-fuel charge) or based on the average cost of fuel in the vicinity at the moment of estimating the driving range.

In block 420, the ECU may determine or predict whether the amount of fuel or electricity remaining in the vehicle is sufficient to complete the determined or predicted route. For example, the ECU may compare the remaining amount of fuel or electricity to the predicted amount of fuel or electricity to be burned along the route.

In block 422, the ECU may control the output device of the vehicle to output some or all of the determinations. For example, the ECU may control the output device to output the fuel economy that was determined in block 414. The ECU may likewise control the output device to output the predicted driving range of the vehicle. The ECU may also control the output device to output the amount of fuel or electricity to be burned along the route along with the remaining amount of fuel or electricity. The ECU may also control the output device to output the amount of fuel or electricity to be burned along each of the routes calculated in block 418. The ECU may also control the output device to output a comparison of the current fuel economy of the vehicle as driven by the driver relative to the expected fuel economy of the vehicle if driven by an average driver. This comparison may provide motivation for the driver to drive in a more fuel-efficient manner.

In some embodiments, the ECU may control the output device to output fuel economy tips that the driver may implement to increase their specific fuel economy. For example, if the driver routinely accelerates fast from a complete stop then the ECU may suggest that the driver accelerate more slowly. As another example, if the driver is driving a hybrid or electric vehicle and comes to rapid stops then the ECU may suggest that the driver stop more gradually in order to increase energy generation during regenerative braking.

In block 424, the ECU may identify at least one recharging station or fuel station along the route. In some embodiments, the ECU may always or periodically identify such stations and, in some embodiments, the ECU may only identify such stations in response to determining that the remaining electricity or fuel is insufficient to complete the route. The ECU may select a recharging station or fuel station based on various factors such as cost of electricity or fuel at various stations, whether the stations have rapid chargers, or an amount of time added to the specific route by stopping to recharge or refuel the vehicle. In some embodiments, the ECU may output multiple stations and allow the user to select a desired station. Also, in optional step 425, the ECU may be updating driving range and the planification of refueling/recharging based on real-time information about the route that would have impact in forecasted fuel economy such as accidents or unexpected closure of roads In block 426, the ECU may control the output device to output navigation instructions to the recharging station or the fuel station, or may control the vehicle to maneuver to the station (if the vehicle is autonomous or semi-autonomous).

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for determining a driving range of a vehicle, comprising:
    an energy storage component configured to store at least one of electrical energy or fuel;
    a power source configured to convert the at least one of the electrical energy or the fuel into mechanical power to propel the vehicle;
    a memory configured to store:
        map data that includes at least one of road speeds, altitude data, road grades, or stop information corresponding to at least one of stop signs or stop lights,
        a first driver profile corresponding to driving behavior of a first driver, and
        route data including at least one of schedule-related information or passenger information of at least one prior driving operation of the vehicle;
    an electronic control unit (ECU) coupled to the memory and configured to predict the driving range of the vehicle based on an amount of the at least one of the electrical energy or the fuel remaining in the energy storage component, the map data, the first driver profile, and a determination that at least one of schedule-related information or passenger information associated with a driving operation match the at least one of the schedule-related information or the passenger information of the at least one prior driving operation of the vehicle included in the route data; and
    an output device coupled to the ECU and configured to output the driving range of the vehicle.

2. The system of claim 1, wherein the memory is further configured to store a vehicle fuel economy profile of the vehicle that corresponds to energy efficiency of the power source, wherein the ECU is further configured to predict the driving range of the vehicle based on the vehicle fuel economy profile.

3. The system of claim 2, wherein the ECU is further configured to determine or update the vehicle fuel economy profile based on at least one of past performance of the power source or present performance of the power source in various driving conditions.

4. The system of claim 1, wherein the ECU is further configured to determine or update the first driver profile based on at least one of past driving behavior of the first driver or present driving behavior of the first driver in various driving conditions.

5. The system of claim 1, wherein:
the ECU is further configured to determine or predict a route to be traversed by the vehicle; and
the driving range includes at least one of an indication that the energy storage component has a sufficient amount of the at least one of the electrical energy or the fuel for the vehicle to complete the route or an amount of the at least one of the electrical energy or the fuel to be consumed while the vehicle traverses the route.

6. The system of claim 1, wherein:
the memory is further configured to store a second driver profile corresponding to driving behavior of a second driver; and
the ECU is further configured to:
identify a current driver of the vehicle,
predict the driving range of the vehicle based on the first driver profile when the first driver is the current driver, and
predict the driving range of the vehicle based on the second driver profile when the second driver is the current driver.

7. The system of claim 1, further comprising a network access device configured to at least one of transmit the first driver profile to a cloud server for storage or receive the first driver profile from the cloud server, the first driver profile being accessible by multiple vehicles.

8. The system of claim 1, further comprising a network access device configured to receive at least one of weather data corresponding to weather events or traffic data corresponding to traffic events, wherein the ECU is further configured to predict the driving range of the vehicle based on the at least one of the weather data or the traffic data.

9. The system of claim 1, wherein:
the ECU is further configured to determine or predict:
a route to be driven by the vehicle, and
a burn amount of the at least one of the electrical energy or the fuel to be consumed by the power source while the vehicle is driven along the route; and
the output device is further configured to output:
the burn amount of the at least one of the electrical energy or the fuel to be consumed by the power source while the vehicle is driven along the route, and
the amount of the at least one of the electrical energy or the fuel remaining in the energy storage component.

10. The system of claim 1, wherein:
the ECU is further configured to:
determine or predict a route to be driven by the vehicle,
determine or predict a refueling event when the driving range is less than a distance associated with the route, and
identify at least one refueling location along the route that is within the driving range of the vehicle, the at least one refueling location being capable of providing electrical energy or fuel to the energy storage component;
the output device is further configured to output information corresponding to the identified at least one refueling location; and
the information is configured to be updated in real-time based on reception of live information regarding accidents or road closures affecting a forecasted driving economy of a current trip.

11. A system for determining a driving range of a vehicle, comprising:
an energy storage component configured to store at least one of electrical energy or fuel;
a power source configured to convert the at least one of the electrical energy or the fuel into mechanical power to propel the vehicle;
a memory configured to store:
map data that includes at least one of road speeds, altitude data, road grades, or stop information corresponding to at least one of stop signs or stop lights,
a first driver profile corresponding to driving behavior of a first driver, and
route data including at least one of schedule-related information or passenger information of at least one prior driving operation of the vehicle on a route to a destination;
an electronic control unit (ECU) coupled to the memory and configured to:
determine, based on the map data, that at least a first portion and a second portion of the route include, respectively, a first road grade and a second road grade associated with, respectively, decreasing and increasing vehicle energy efficiency,
predict a future energy efficiency of the vehicle on the route (i) based on a historical energy efficiency of the power source, the map data, and the first driver profile, and (ii) in response to the determination that at least the first and the second portions the route include, respectively, the first and the second road grades, and
determine the driving range of the vehicle based on the predicted future energy efficiency of the vehicle on the route and a determination that at least one of schedule-related information or passenger information associated with a driving operation match the at least one of the schedule-related information or the passenger information of the at least one prior driving operation of the vehicle on the route; and
an output device coupled to the ECU and configured to output the future energy efficiency and the driving range of the vehicle.

12. The system of claim 11, wherein:
the memory is further configured to store a vehicle fuel economy profile of the vehicle that corresponds to the historical energy efficiency of the power source; and
the ECU is further configured to update the vehicle fuel economy profile based on a current energy efficiency of the power source and predict the future energy efficiency of the vehicle based on the vehicle fuel economy profile.

13. The system of claim 11, wherein the ECU is further configured to determine or update the first driver profile based on at least one of past driving behavior of the first driver or present driving behavior of the first driver in various driving conditions.

14. The system of claim 11, wherein:
the memory is further configured to store a second driver profile corresponding to driving behavior of a second driver; and
the ECU is further configured to:
identify a current driver of the vehicle,
predict the future energy efficiency of the vehicle based on the first driver profile when the first driver is the current driver, and predict the future energy efficiency of the vehicle based on the second driver profile when the second driver is the current driver.

15. The system of claim 11, further comprising a network access device configured to receive at least one of weather data corresponding to weather events or traffic data corresponding to traffic events, wherein the ECU is further configured to predict the future energy efficiency of the vehicle based on the at least one of the weather data or the traffic data.

16. The system of claim 11, wherein:
the ECU is further configured to determine or predict:
a route to be driven by the vehicle, and
a burn amount of the at least one of the electrical energy or the fuel to be consumed by the power source while the vehicle is driven along the route; and
the output device is further configured to output:
the burn amount of the at least one of the electrical energy or the fuel to be consumed by the power source while the vehicle is driven along the route, and
an amount of the at least one of the electrical energy or the fuel remaining in the energy storage component.

17. The system of claim 11, wherein:
the ECU is further configured to determine or predict a destination for a current vehicle trip and determine a proposed route for the current vehicle trip based on the future energy efficiency of the vehicle; and
the output device is further configured to output the proposed route for the current vehicle trip.

18. A method for determining a driving range of a vehicle, comprising:
storing, in an energy storage component, at least one of electrical energy or fuel;
converting, by a power source, the at least one of the electrical energy or the fuel into mechanical power to propel the vehicle;
storing, in a memory:
map data that includes at least one of road speeds, altitude data, road grades, or stop information corresponding to at least one of stop signs or stop lights,
a first driver profile corresponding to driving behavior of a first driver, and
route data including at least one of schedule-related information or passenger information of at least one prior driving operation of the vehicle;
predicting, by an electronic control unit (ECU), the driving range of the vehicle based on an amount of the at least one of the electrical energy or the fuel remaining in the energy storage component, the map data, the first driver profile, and a determination that at least one of schedule-related information or passenger information associated with a driving operation match the at least one of the schedule-related information or the passenger information of the at least one prior driving operation of the vehicle included in the route data; and
outputting, by an output device, the driving range of the vehicle.

19. The method of claim 18, further comprising determining or updating, by the ECU, the first driver profile based on at least one of past driving behavior of the first driver or present driving behavior of the first driver in various driving conditions.

20. The method of claim 18, further comprising determining or predicting, by the ECU, a route to be traversed by the vehicle, wherein the driving range includes at least one of an indication that the energy storage component has a sufficient amount of the at least one of the electrical energy or the fuel for the vehicle to complete the route or an amount of the at least one of the electrical energy or the fuel to be consumed while the vehicle traverses the route.

* * * * *